(12) United States Patent
Baker et al.

(10) Patent No.: US 8,253,087 B2
(45) Date of Patent: Aug. 28, 2012

(54) OPTICAL CHARACTERISTIC MAPPING INSTRUMENT

(75) Inventors: Howard Baker, Edinburgh (GB); Jesus F. Monjardin-Lopez, Farmington, CT (US); Francisco J. Villarreal-Saucedo, Avon, CT (US); Roy McBride, Fife (GB)

(73) Assignee: Powerphotonic Ltd, Dundee (GB)

( * ) Notice: Subject to any disclaimer, the term of this patent is extended or adjusted under 35 U.S.C. 154(b) by 684 days.

(21) Appl. No.: 12/439,092

(22) PCT Filed: Aug. 29, 2007

(86) PCT No.: PCT/GB2007/003217
§ 371 (c)(1),
(2), (4) Date: Feb. 26, 2009

(87) PCT Pub. No.: WO2008/025958
PCT Pub. Date: Mar. 6, 2008

(65) Prior Publication Data
US 2010/0012818 A1    Jan. 21, 2010

(30) Foreign Application Priority Data
Aug. 29, 2006 (GB) .................................. 0616974.2

(51) Int. Cl.
*G01J 9/00* (2006.01)
*G01J 1/42* (2006.01)
*G01J 1/20* (2006.01)

(52) U.S. Cl. .................................... 250/201.9; 356/121

(58) Field of Classification Search ............... 250/201.9; 356/121; 374/32; 359/209.1
See application file for complete search history.

(56) References Cited

U.S. PATENT DOCUMENTS

| 4,474,467 A | 10/1984 | Hardy et al. |
| 4,828,384 A * | 5/1989 | Plankenhorn et al. ........ 356/121 |
| 2003/0174314 A1 | 9/2003 | Riza |

FOREIGN PATENT DOCUMENTS

| EP | 0 319 345 A2 | 6/1989 |
| JP | 01-316617 | 12/1989 |
| WO | 00/66984 A1 | 11/2000 |
| WO | 02/28272 A1 | 4/2002 |

* cited by examiner

*Primary Examiner* — Seung C Sohn
(74) *Attorney, Agent, or Firm* — Young Basile

(57) ABSTRACT

A system for measuring the wavefront characteristics of a powerful laser close to an emitting or transmitting surface of the laser. The system includes a beam sampler that has a sampling aperture for sampling radiation from a sampled area along the emitting or transmitting surface. The beam sampler includes a reflector for directing un-sampled radiation onto an absorber, which absorbs un-sampled radiation. Radiation sampled by the beam sampler is sensed using a sensor.

50 Claims, 5 Drawing Sheets

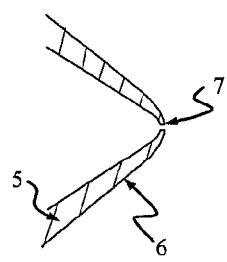
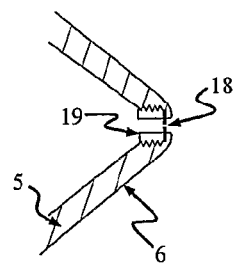
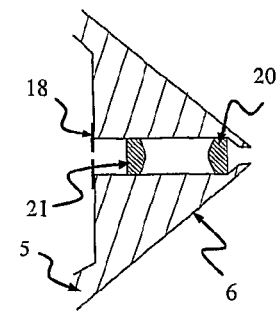
Figure 3          Figure 4          Figure 5
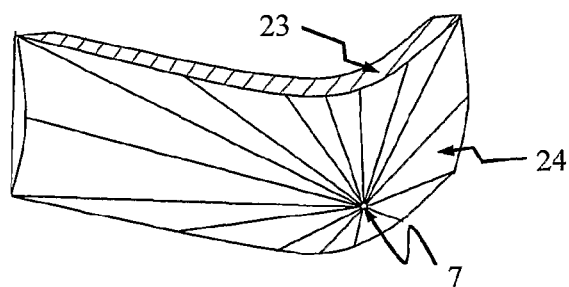
Figure 6
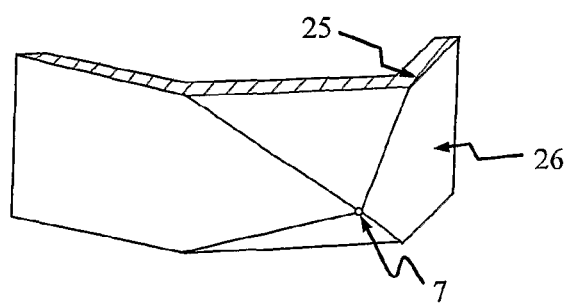
Figure 7

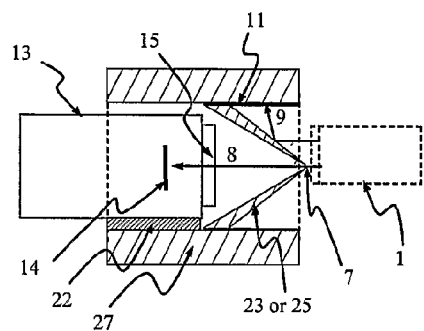 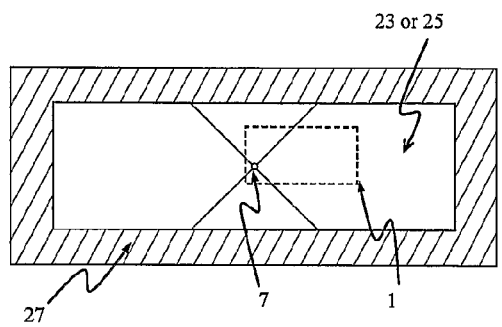
Figure 8　　　　　　　　　　Figure 9
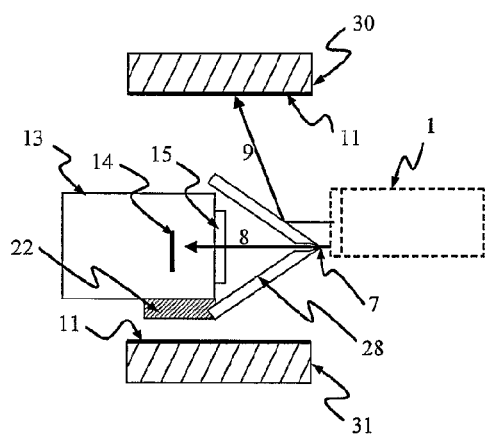 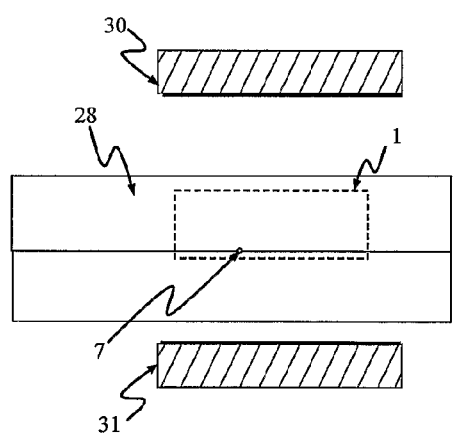
Figure 10　　　　　　　　　Figure 11

OPTICAL CHARACTERISTIC MAPPING INSTRUMENT

FIELD OF THE INVENTION

The present invention relates to a system for measuring the wavefront characteristics of a laser beam, and in particular laser beams from laser diode bars.

BACKGROUND OF THE INVENTION

A laser diode bar is a monolithic array of semiconductor diode lasers. All lasers in the array emit from the same facet of a cleaved die. Light is typically emitted in a direction perpendicular to the emitting facet. The output power is typically 20-150 W per bar for commercial lasers, and each bar may have an emitting length of 10 mm. Where diodes in the array are multimode lasers, the modes are highly confined in the out-of-plane direction (the "fast axis") and have near-identical near-field distributions in this direction. The main mode structure is field variation in the in-plane direction (the "slow axis"). In the far field, these beams are highly divergent in the fast axis, and diverge more slowly in the slow axis. Fast-axis divergence may be reduced using a fast-axis collimation lens. In its simplest form this can be a cylindrical rod lens or plano-cylindrical lens placed immediately next to the emitting facet of the diode bar, although better collimation can be achieved using acylindrical lens surfaces.

Due to the high divergence of the beam and short focal length of the lens, small errors in the distance between the diode facets and the collimation lens can lead to defocusing and angular errors in the collimated beam. Ideally the bar is perfectly straight, so that the centres of all emitters lie in a straight line, but in practice, due to inherent strains and mechanical effects due to mounting, the bar is curved or "bowed" and the emitters do not lie on a straight line. Bowing means that a rod lens perfectly aligned for the first and last diodes will be misaligned for central diodes, leading to a spread in the far field patterns, and hence increased beam divergence for the overall collimated bar. Similarly, twisting or other deformation of the lens can result in misalignment giving angular error and increased divergence. Even "acylindrical" fast-axis collimating lens lenses may introduce significant aberrations, further increasing divergence.

Achieving correct collimation all the way along a 10 mm bar is extremely difficult. The effect of lens misalignments and aberrations is that the far-field beams from individual diodes point in slightly different directions and have differing angular spreads, typically exceeding the angular spread for perfect fast-axis collimation. This leads to an uneven power distribution in the far field, which results in uncontrolled and unpredictable beam spread and a reduction of the average radiance of the laser source. The commonly used plano-acylindrical rod lenses that are perfectly corrected at the centre of the angular spread of emission in the plane of the slow axis have a different focal length and significant aberrations for rays that are off-axis in this direction. This further reduces the average radiance of the laser source. It is common practice to quantify the degradation in overall beam of a laser source by measuring the $M^2$ parameter. However, although this quantifies the overall error, a measurement of $M^2$ does not identify the precise origins of the error.

Bars are often stacked together as a high power diode laser stack to increase the total power available from a compact source. A bar that is to be assembled into a stack may be fitted with a fast-axis collimating lens before stacking. More usually, uncollimated bars are assembled into a stack before collimating lenses are attached. Stacks are usually assembled so that beams from the constituent bars are either parallel or arranged to coincide on a specific target plane. Combining bars to form stacks therefore introduces an additional alignment requirement: the relative orientation of the beams from separate bars. Where bars have been collimated before stacking, mechanical errors in stacking lead to slight errors in the pointing direction of different bars, increasing the beam divergence of the overall beam and decreasing beam quality. More generally, mechanical misalignment between the fast-axis collimating lens and the bar leads to pointing errors in individual bars, even when there is no mechanical misalignment due to stacking.

Bars typically dissipate large amounts of heat in a small volume. Laser operation depends on temperature, and so cooling is often critical. Large temperature changes combine with differences in thermal expansion coefficient between bar and cooler, leading to a temperature-dependence of the previously described bowing effect. Thermal gradients also lead to mechanical distortions. Excessive temperatures degrade the optical performance of the bars, so water-cooling is often used to remove heat. In the case of stacks, water-cooling plates are often interleaved between the bars. Typically these are very thin and use very narrow arrays of water channels, meaning that high water pressure is needed. This combined with the very thin structure can lead to mechanical distortion, and so to further optical distortion.

Brightness and beam uniformity are key performance parameters of bars and stacks. A typical objective in the design and manufacture of collimated stacks is to achieve a uniform and intense distribution of power over some target area, with an intensity as close as possible to the theoretical limit defined by the beam quality of the individual emitters. Far-field intensity measurements can be used to quantify the overall performance of the collimated bar or stack, but do not in general identify the origins of reduced brightness, since the far-field beams cannot be easily related to the field close to the fast-axis collimation lens, particularly since the far-field power distributions that are measured typically have overlapping of beams from multiple elements in a bar and multiple bars in a stack. This is a problem, because without knowledge of the origins of the reduced brightness and/or beam uniformity, it is impossible to correct for these.

Instruments that can measure phase and power distribution over a wavefront are known, for example the Shack-Hartmann sensor. These have typically been designed to measure wavefront errors on low-power-density signals. Using them for direct measurement of high-power beams close to the laser output poses serious problems in disposing of heat if an absorbing attenuator is used. Relay optics incorporating reflective attenuators may be used to relay a low-power image of the region of interest onto the sensor. However, these can introduce unwanted aberrations and other errors, particularly in the case high power diode laser bars and stacks, whose beams have detailed transverse structure and significant divergence.

SUMMARY OF THE INVENTION

According to one aspect of the present invention, there is provided a system for measuring wavefront characteristics of a laser, the system including a beam sampler for sampling an area of the laser beam, a sensor for sensing light sampled by the beam sampler and means for disposing of unwanted laser power that minimizes feedback to the laser. Preferably, measurements at a plurality of points across the beam can be made.

By ensuring that unwanted radiation is dissipated, the present invention can operate close to an exit surface of a high power laser, and can provide high spatial and angular resolution, even when the laser operates at full output power. It is particularly suited to determining the wavefront characteristics of a high power laser beam, such as a high power diode laser beam.

The system may be implemented in the form of a scanning head that is operable to be scanned across the beam in order to collect measurements.

A single measurement can be used to determine the mean pointing direction over a small area of the laser beam and the mean intensity over this area.

A plurality of measurements may be taken by scanning the scanning head and combined to provide a map of local mean pointing directions across the laser beam, the spatial beam intensity distribution of the laser beam, and the divergence properties of the laser beam.

The beam sampler may define a sampled area of a cross-section of the beam, by use of a pinhole or similar physical aperture. Optionally, an optical system, for example, one or more lenses, may be used to relay an image of the sampled area on to the pinhole or aperture. In this case, it is a virtual aperture that is scanned across the beam. This permits beam sampling close to the laser without requiring mechanical access to this area. Preferably, the optical system is telecentric.

The dimensions of the sampled area must be small enough to sufficiently localize the area of the beam being measured in order to give the required spatial resolution of the pointing map. The sampled area may have dimensions in the range of 10-100 microns, preferably 20-50 microns.

The propagation of light after leaving the aperture will be modified by diffraction due to the aperture. The term "diffraction pattern" is used to denote the intensity distribution across any cross-section of the beam after propagation beyond the aperture.

The mean pointing direction of the beam over the sampled area may be derived from the position of the centroid of the diffraction pattern and its distance from the sampling aperture.

The sampler may be scanned across various points on the laser beam to produce a set of diffraction patterns from these points.

The sensor may be any device that enables the measurement of a signal or set of signals that are related to the intensity distribution over the diffraction patterns produced by the beam sampler and from which the centroid of the intensity distribution can be recovered. A two-dimensional image sensor, such as a charge coupled device (CCD) array, or a complementary metal oxide semiconductor (CMOS) array detector, would be suitable. A quadrant photodetector, or a two-dimensional position sensitive photodiode (PSD) may be used. The sensor may alternatively be a one-dimensional photodetector, such as a CCD or CMOS photodiode linear array, a lateral effect photodiode, or a dual-element photodiode.

The sensor may incorporate a wavelength-converting material in close proximity to a detector to allow operation over additional wavelength ranges. The sensor may have one or more attenuating filters positioned in front of it to reduce the power of the sampled beam to within the operating range of the sensor.

Two or more sensors may be provided. A beam divider may be located between the aperture and the sensor for dividing the beam into two or more parts. The two or more parts of the beam may be directed onto two or more sensors. The two or more sensors may be of different types.

The distance between the sampling point and the sensor is chosen so that the diffraction pattern created by the sampling point is substantially contained within the active area of the sensor for the entire measurement range. This means that the centroid of the beam can be reliably determined. Where the beam under investigation has high spatial coherence in one direction and low spatial coherence in the perpendicular direction, for example the beam from a multimode diode laser stripe, a substantial part of the diffraction pattern may extend beyond the sensor in the direction of low coherence, in which case the centroid in this direction will not be measured.

The means for the disposal of unwanted laser power may be any device that can dispose of the large amount of laser power not in or immediately adjacent to the sampled area of the laser beam, and thus not required by the measurement sensor. A reflective device is provided for permitting the disposal of power in a manner that does not affect measurement accuracy, avoids causing feedback to the laser as this can cause damage to the laser or affect the wavefront characteristics being measured, and does not produce a safety hazard. This allows measurements to be made at normal or full laser operating power.

The means for the disposal of unwanted laser power may be implemented in the form of a device for deflecting the unwanted laser power incorporating a highly reflecting surface reflecting power to a water-cooled metal element with a black coating, allowing the efficient absorption of laser light. The surface of this element could be structured, for example with fins, in order to increase the light trapping and hence increase absorption of laser power.

The sensor may be operable to take measurements at a single or a number of differing points. Preferably, this is done by scanning the beam sampler across the laser wavefront or by scanning the laser beam source across the sampler.

The system may include means for analyzing the measurements taken by the sensor. The means for analyzing may be operable to determine the centroid of the diffraction pattern in either one or both axes, and use this to determine a component of beam pointing along an axis. Algorithms for determining the centroid of a diffraction pattern are well known.

The means for analyzing may be operable to determine the local intensity of the beam. This can be done by calculating the total power contained in the diffraction pattern from the sensor, for example by summation of pixel values, or by the insertion of an auxiliary single-element photodetector, for example a photodiode, in front of the sensor that collects the whole diffraction pattern.

If a single measurement is taken, this measurement directly indicates local beam pointing direction and intensity. If a number of measurements at different locations are taken, these can be used to create a map of the laser beam. In this case, the position where the measurements are taken should be known.

The trigonometric tangent of the mean beam pointing angle is the offset of the centroid from a reference position divided by the reduced axial distance from the beam sampler to the sensor, where the reduced axial distance in a homogenous medium is given by the true axial distance divided by the refractive index. Typically, the beam pointing angle is sufficiently small that its tangent is approximately the value of the beam pointing angle in radians.

If an array detector is used, additional information on local wavefront characteristics can be obtained by comparing the measured diffraction pattern with the expected diffraction pattern for a plane wave, or by comparing the statistics of the diffraction pattern, for example the second and higher order moments, with the expected statistics of a diffraction pattern for a plane wave.

A screen may be placed between the sensor and the sampling aperture. The screen may be close to or part of the sensor. The screen may comprise an optical diffuser. Means may be provided for moving the diffuser so as to average out the effects of laser speckle on the beam incident on the sensor. The means for moving may be operable to translate, rotate or vibrate the diffuser. The screen may comprise a wavelength-converting material. The wavelength converting material may comprise a phosphorescent screen.

A single lens or a system of multiple lenses or other optical elements may be provided for relaying the image of the beam incident on the screen to an image plane where the sensor is placed. The single lens or system of multiple lenses or other optical elements may be such that the image of the diffraction pattern incident on the sensor is substantially contained within the sensor's active area.

BRIEF DESCRIPTION OF DRAWINGS

Various aspects of the invention will now be described by way of example only and with reference to the accompanying drawings, of which:

FIG. 3 is a cross section through an aperture that can be optionally used in a part of the beam sampler of FIG. 1;

FIG. 4 is a cross section through another optional aperture configuration;

FIG. 5 is a cross section through yet another optional aperture configuration

FIG. 6 is a perspective view of an optional reflector part for use in the beam sampler of FIG. 1;

FIG. 7 is a perspective view of another optional reflector part for use in the beam sampler of FIG. 1;

FIG. 8 is a cross-section through a beam sampler head in which the reflector of FIG. 6 or FIG. 7 is used;

FIG. 9 is front view of the beam sampler head of FIG. 8 for the case in which the reflector of FIG. 7 is used;

FIG. 10 is a cross-section through another beam sampler head with separate absorbing elements;

FIG. 11 is a front view of the beam sampler head of FIG. 10;

DETAILED DESCRIPTION OF THE DRAWINGS

Figure 1:
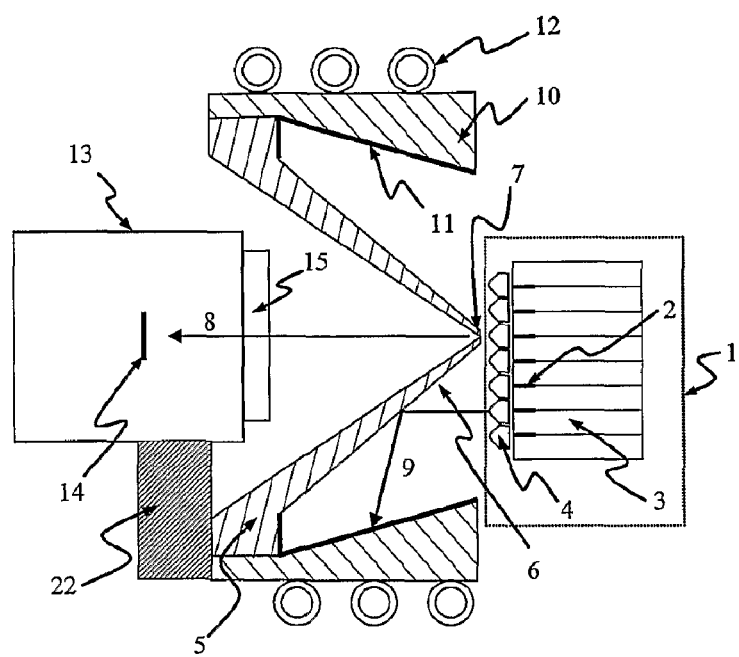
FIG. 1 is a schematic diagram of a beam sampler head positioned in front of a diode laser stack.

FIG. 1 shows an arrangement for measuring the wavefront of light output from a laser, in this case a laser diode bar stack 1 that has a plurality of individual laser diode bars 2 mounted on cooling plates 3, each bar having at its output a cylindrical lens 4, which acts as a fast-axis collimator (FAC). Light from each bar is collimated in only one direction by its lens 4. Facing the laser diode stack is a beam sampler 5, which is configured to withstand the high local intensity of the laser beam, and minimize the power reflected back into the laser. The sampler 5 is operable to sample a small area of the beam close to the laser and produce a diffraction pattern from the sampled area. The beam sampler is shaped, so that samples can be obtained from as close to the emitting or transmitting surface of the laser as possible. To this end, the beam sampler has a sampling point that is located at a physical extremity, so that it can be moved substantially unimpeded to a position very close to the laser output. In the example of FIG. 1, the aperture is formed at an apex of the beam sampler. Typically, the beam sampler is arranged so that its sampling tip can approach the surface of the FAC lenses to within 0.2 mm, although this is not always possible due to the mechanical arrangement of the stack.

The beam sampler 5 of FIG. 1 has a high reflectance conical mirror surface 6, for example a surface coated with gold or a multi-layer dielectric coating designed for the wavelength of the laser under test. Formed through the apex of the cone is a beam-sampling aperture 7 that is sized so as to define the spatial resolution of the beam sampler, by defining a sampled area. Typically, a small aperture is used in order to achieve high spatial resolution and where this is the case the shape of the diffraction pattern depends mainly on the shape of the aperture. Because this aperture is located at a physical extremity of the sampler, it can be moved substantially unimpeded to a position very close to the emitting or transmitting surface of the laser.

Surrounding and connected to the conical surface 6 is an absorbing element 10 that has a coating 11 for absorbing unwanted light from the laser preferably and typically >90% of that light and a cooling arrangement 12 for removing heat. The purpose of the conical mirror surface 6 is to direct that part of the beam not immediately on or adjacent to the sampling aperture 7 onto the absorbing element 10. This is best achieved when the half-angle of the conical mirror surface 6 is approximately 45° or less. The laser diode bar stack 1 can have powers from hundreds of watts to kilowatts, but ideally the power transmitted by the sampling aperture is only a few tens of milliwatts. Hence, the conical mirror 6 and the absorbing element 10 have to be capable of disposing of significant amounts of power.

Behind the aperture 7 is an electronic camera 13 that is rigidly mounted to the rear of the beam sampler assembly 5 by a connecting piece 22. Included in the camera 13 is an active surface 14 that is operable to detect light at the wavelength of the laser under investigation. The spacing between the sampling aperture 7 and the surface 14 is chosen so that the diffraction pattern created by the aperture 7 is substantially contained within the active area 14 for the entire measurement range of beam pointing. This means that the centroid of the beam can be reliably determined. For example, a 40 micron diameter circular pinhole used with a ⅔ inch CCD camera will typically require a distance of 53 mm, providing an angular measurement range of 50 mrad. Provided in front of the active surface 14 are attenuating filters 15. These are preferably several sheets of volume-absorbing glass, such as that manufactured by the Schott or Hoya glass companies, for example Schott NG3. This reduces the light level incident on the camera by typically $10^3$ to $10^5$ to ensure that the camera 13 is not overloaded.

Figure 2:
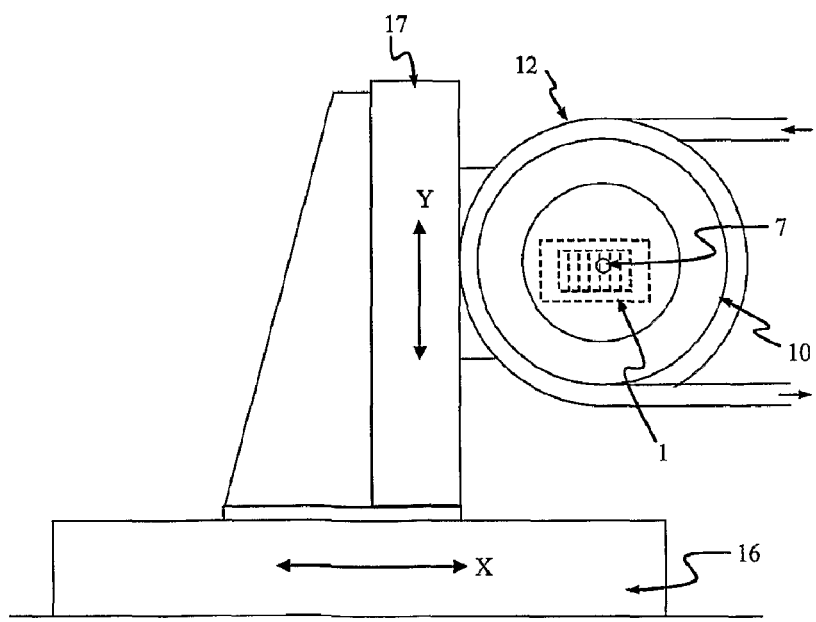
FIG. 2 is a front view of a mechanism for scanning the beam sampler head of FIG. 1.

The unit consisting of the beam sampler assembly 5, with its light absorption element 10, and the electronic camera 13 is mounted on a computer controlled motorized XY translation system, so that the sampling aperture 7 can be moved in a plane tangential to the cylindrical lenses 4. FIG. 2 shows a suitable system. This has a lower motorized translation stage 16 for causing movement in the x direction and an orthogonally mounted motorized translation stage 17 for causing movement in the y direction. The scanner's movement is synchronized with the acquisition of measurements at predetermined locations, and so that data can be collected and processed at a range of predetermined points in space, usually in the form of a grid pattern that covers the full emission areas of the bars 2 in the stack 1. Alternatively, measurements could be taken at arbitrary points and the data interpolated, rather than at pre-determined locations.

The aperture 7 typically has a diameter of 10 to 100 microns, preferably 20 to 50 microns. This determines the spatial resolution of the instrument. FIGS. 3 to 5 illustrate suitable aperture configurations. In particular, FIG. 3 shows a circular sampling aperture that is directly formed at the apex of the conical surface 6 by, for example, a laser drilling process. In this case, the material at the apex is rounded and thinned down to avoid light scatter from sidewalls. This allows it to be positioned very close to the cylindrical lenses 4 of the laser 1. The one-piece nature of this element allows any heat deposited at the apex to conduct into the body of the beam sampler 5. FIG. 4 shows an alternative arrangement in which the sampling aperture 7 is pre-drilled in a disc of metal foil 18 that is held in the apex of the conical part 6 by hollow screw 19. In this case the clamping effect of the screw 19 is responsible for the conduction of any heat from the foil disc to the beam sampler 5.

As noted previously, to obtain an accurate measure of the wavefront over a specific plane, it is important for the sampling point to be configured so that it can be positioned as close to that plane as possible. Sometimes, however, this can be difficult to arrange physically, for example, where a window or one or more optical components are provided in front of the laser output or a mechanical component lies close to the edge of the beam. In these circumstances, a virtual, optically generated aperture could be used, as shown in FIG. 5. In this case, the sampling aperture 7 is defined in a pre-drilled disc of metal foil 18, and light is directed to this by a pair of lenses 20 and 21 that form a telecentric relay, such that a virtual sampling aperture is created in front of the apex. This has the advantage that the measuring plane can be projected ahead of the apex, allowing scanning of the laser diode stacks 1 that have features that prevent the apex reaching the desired scan plane. The focal lengths of the two lenses 20 and 21 may be equal, to produce a virtual aperture of the same size as the physical aperture, or may have unequal focal lengths giving magnification or demagnification. In the examples of both FIGS. 4 and 5, the surface of the metal foil 18 may be treated to reduce reflection back into the laser, for example by chemically blackening or mechanically roughening the surface.

In use, measurements may be taken at a single or a number of differing points across the wavefront of the laser beam under interrogation. Where multiple measurements are required, preferably this is done by scanning the beam sampler and sensor across the wavefront of the laser beam under interrogation. Measurements taken by the sensor are then analyzed. Each measurement point gives a diffraction pattern. Where the beam is a plane wave and the aperture is circular, the diffraction pattern is an Airy function. Where the beam has high spatial coherence in one direction and low spatial coherence in the perpendicular direction, for example in the case of a beam from a multimode diode laser stripe, the diffraction pattern is an Airy function in the first direction, and is a more elongated function in the second direction.

To determine the local beam pointing direction, the centroid of the diffraction pattern has to be found in either one or both axes. The centroid is also often referred to as the "first moment". Definitions of this are well known, as are methods for calculating it from measurements taken by array detectors. Many other suitable means of finding the centre of the beam exist that do not necessarily give the true centroid, for example, least squares fitting of a quadratic around the peak or finding the midpoint of the half-maxima. Where the sensor is an array detector, the beam pointing direction can be derived from the centroid of the diffraction pattern by numerical computation using known algorithms, for example the algorithm implemented within the Spiricon beam analysis software. Where the sensor is a one or two dimensional position sensitive detector, such as a lateral-effect photodiode, or a quadrant or dual element detector, other well-known methods can be used to determine the centroid of the diffraction pattern. For example, for a 1D position-sensitive detector, the output is a pair of photocurrents I1 and I2 that can nominally be related to a position x by the formula $(I2-I1)/(I2+I1)=2x/L$, where L is a characteristic length of the detector.

As well as beam pointing direction, local intensity of the laser beam can be determined. This can be done by calculating the total power contained in the diffraction pattern from the sensor signal, for example by summation of pixel values, or by the insertion of an auxiliary single-element photodetector, for example a photodiode, in front of the sensor that collects the whole diffraction pattern. If a single measurement is taken, this measurement directly indicates beam pointing direction and intensity. If a number of measurements at different locations are taken, these can be used to create a map of the laser beam. In this case, the position where the measurements are taken should be known.

Where it is necessary to scan a laser diode stack with a large number of bars, the simple conical shape of the beam sampler 5 of FIG. 1 will in practice be large and heavy, as its overall diameter should be more than twice the emitting width of the laser diode stack to intercept all the laser light at all positions in the scan. In order to reduce the weight, a truncated cone shape 23 may be used in place of the conical part 6, as illustrated in FIG. 6. Alternatively, a truncated pyramid shape 25 may be used, as shown in FIG. 7. The flat facets 26 of this can be produced by, for example, diamond machining or conventional lapping and polishing methods to ensure that a high reflectance surface is produced. Surrounding the truncated cone 23 or pyramidal reflector 25 is an absorbing element 27 of generally rectangular shape, see FIGS. 8 and 9, which as before is coated with a highly absorbing coating 11 and includes a cooling arrangement, such as a water based cooling system (not shown).

Figure 12:
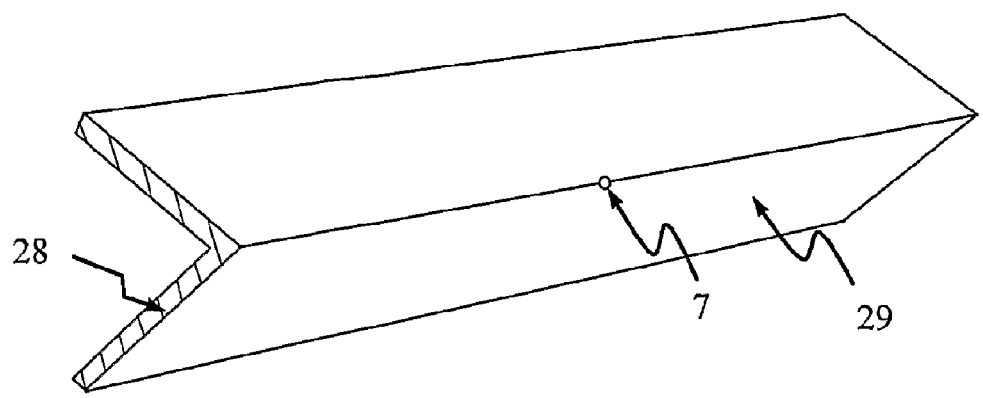
FIG. 12 is a perspective view of a reflector element that is used in the beam sampler head of FIGS. 10 and 11.

FIGS. 10 and 11 show an arrangement that allows weight to be reduced further. This includes a beam sampler having an aperture 7 that is formed through the apex of a convex roof reflector 28 that has two high reflectance flat faces 29, as shown in FIG. 12. These reflect the majority of the laser light to physically separated absorbing elements 30, 31. As before, the absorbing elements 30 and 31 have highly absorbing coatings for disposing of unwanted light and a cooling arrangement for disposing of the heat generated by that light. The sampling aperture 7 is formed at the centre of the apex of the convex roof reflector 28 and directs sampled light onto the camera 13 through attenuating filters 15. The camera 13 and attenuating filters 15 are attached behind the convex roof reflector 28 in the same way as for the conical reflector 6 in FIG. 1. The unit consisting of the camera 13 and the reflector 28 is carried on a movable stage, whereas the absorbing elements 30 and 31 are not, but instead are stationary. Because only the reflector and camera have to be moved, the parts carried on the scanning table are lighter than those described above. This is advantageous particularly when a diode laser with a large number of diode bars is to be scanned.

A skilled person will appreciate that variations of the disclosed arrangements are possible without departing from the essence of the invention. For example, whilst the beam sampler is described above generally as having a circular aperture, an elliptical, square, or rectangular aperture could be used instead.

As another example, a single lens or a system of multiple lenses could be placed between the aperture and the sensor to increase or decrease the size of the diffraction pattern on the sensor, allowing greater freedom in choice of sensor size and distance between aperture and sensor. In these cases, the relationship between local beam pointing and centroid position would be changed. By using cylindrical or anamorphic lenses, the size of the diffraction pattern could be changed by different amounts in the x and y directions.

Figure 13:
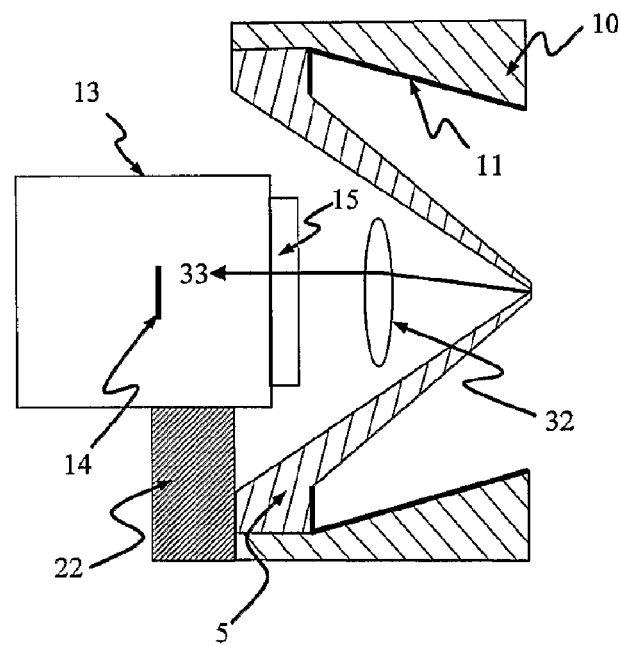
FIG. 13 is a cross-section through a beam sampler head that incorporates a lens that collimates the beam before it reaches the sensor.

FIG. 13 shows a particularly advantageous case. Here, a converging lens 32 is placed at its focal distance behind the aperture so that the beam travelling between this lens and the sensor is substantially collimated. This is illustrated in FIG. 13 by the path of the ray 33. This provides the advantage of light falling substantially normal to the sensor surface, avoiding effects due to the angular sensitivity of the sensor. This provides the additional advantage of allowing the thickness of an attenuating filter placed between the lens and the sensor to be changed without substantially changing the relationship between the mean pointing direction of the beam and the beam centroid position on the sensor.

Where a 1-dimensional sensor is used to measure the centroid of the diffraction pattern in one direction, a cylindrical lens could be placed between the aperture and sensor to produce an image of the aperture in the other direction, so that the shape of the diffraction pattern is better matched to the geometry of the detector. In this case, the aperture and the sensor are at conjugate points of the cylindrical lens.

Where a 2-dimensional sensor is used to measure the centroid of the diffraction pattern in one direction only, a combination of a slit-shaped aperture and a cylindrical lens could be used instead, positioned so that the cylindrical lens focuses light in the direction of the long dimension of the slit, with the slit and the camera active area at conjugate points of the cylindrical lens, thereby allowing the measurement of a set of centroids from different areas along the slit. This effectively allows the processing of a large number of apertures in parallel, giving speed advantages.

Figure 14:
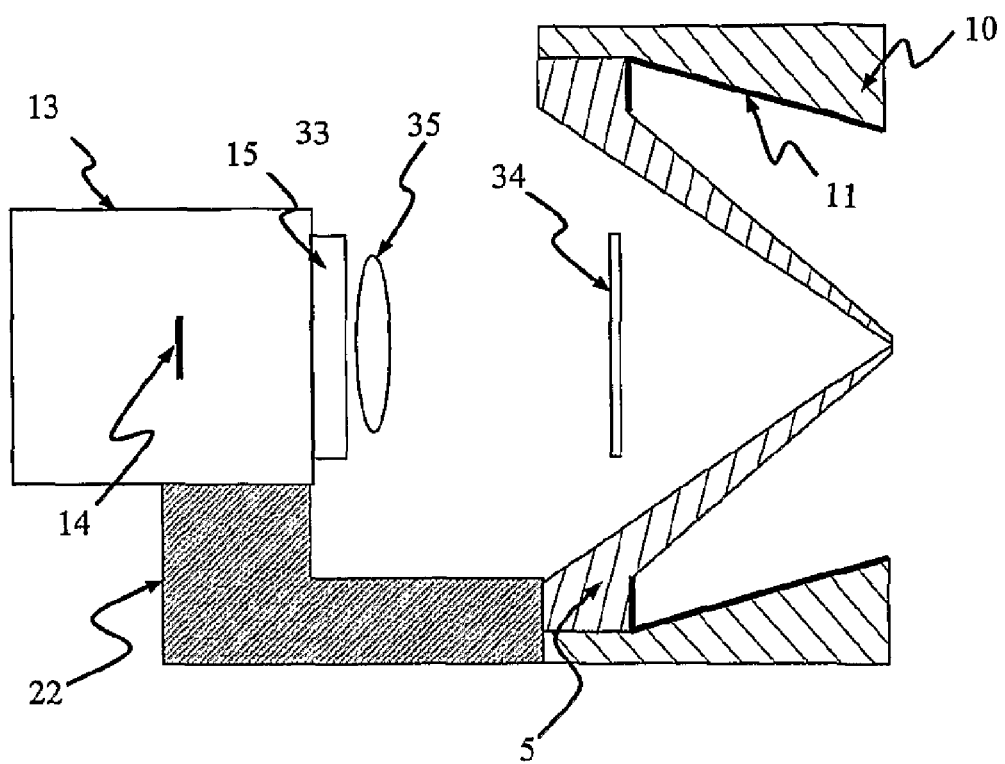
FIG. 14 is a cross-section through a beam sampler head that incorporates a screen and relay lens.

In any of the embodiments described above, a diffusing screen 34 could be placed between the sensor and the beam sampler, ideally in a position previously occupied by the sensor, and the image of the beam incident on the diffusing screen could be relayed by an optical system, for example a single lens 35 or a system of multiple lenses, to the sensor placed in a new location, as shown in FIG. 14. Preferably, the single lens or system of multiple lenses or other optical elements is such that the diffraction pattern incident on the sensor is substantially contained within the sensor's active area, although this is not essential. Where a diffuser is used with the additional optical system the connecting piece 22 must be extended.

Using a diffusing screen reduces the level of light incident on the sensor, so that less attenuation is required from the attenuating filters. This also allows an aperture to be used to control the level of light incident on the sensor, in the same way as in a photographic camera. Where a single element lens is used, the aperture would be placed either immediately before or immediately after the lens 35. Where a multiple-element lens is used, the aperture could also be placed between lens elements. The capability to use an aperture, particularly a variable aperture such as an iris diaphragm, in this way is of particular importance when characterizing pulsed lasers, where it may not be possible to control sensor signal level adequately through control of the exposure time. In cases where the diffuser exhibits strong forward transmission, it may be necessary to relay an image off-axis. In this case, calibration will be required to correct for image distortion and consequent impact on beam centroid location on the sensor. Where the effects of laser speckle affect the accuracy of centroid position measurement, the diffuser may be translated, rotated, vibrated, or otherwise moved so as to average out the effects of laser speckle on the beam incident on the sensor. In the case of pulsed beams whose pulse length is too short to permit temporal averaging over a single pulse, the centroid measurement may be averaged over two or more pulses.

Where the wavelength of the beam being characterized is such that suitable sensors are expensive or are not readily available, for example in the wavelength range 1400 nm-3000 nm, the diffusing screen could be replaced by a screen of a material that converts wavelength to that within the operating range of the sensor whilst preserving the spatial pattern of the incident light. For example, there are a number of commercially available materials such as infrared phosphors that convert near infrared into visible light. Typically these require excitation by a separate light source. These materials need not have a perfectly linear response, as it is only necessary that the centroid of the beam intensity distribution be preserved.

As yet another option, the beam may be divided along the optical path between the aperture and the sensor. This could be done by one or more beamsplitters. This would allow the light to be sent to one or more sensors of the same or different types. An advantage of this is that it allows the pointing to be measured in more than one direction. For example, using a beamsplitter and pair of one-dimensional detectors, the pointing could be measured in two axes without the need for a two-dimensional detector. A further advantage of dividing the beam is that it opens the possibility of distributing the beam between different types of sensor, for example the combination of a two-dimensional PSD with a CCD or CMOS two-dimensional array. As a specific example, a very high-speed pointing measurement taken by a PSD could be combined with diagnostic measurements taken using a CCD, or an accurate high pointing measurement by a CCD could be combined with an accurate measurement of power using single-element photodiode.

Whilst some specific examples are given, any method of determining pointing direction from the centroid of the diffraction pattern may be employed. Accordingly, the above descriptions of specific embodiments are made by way of examples only and not for the purposes of limitation. It will be clear to the skilled person that minor modifications may be made without significant changes to the operation and features described.

The invention claimed is:

1. A wavefront measurement system for measuring a mean pointing direction over a sampled area of a laser wavefront close to an emitting or transmitting surface, the system comprising:
   a beam sampler having a sampling aperture that defines a sampled area of the laser wavefront and samples radiation from the sampled area;
   an absorber for absorbing un-sampled radiation;
   a reflector for directing the un-sampled radiation onto the absorber; and
   a sensor for sensing the radiation sampled by the beam sampler; wherein the sensed radiation is a diffraction pattern on the sensor and the mean pointing direction over the sampled area of the laser wavefront is based on the diffraction pattern.

2. A wavefront measurement system as claimed in claim 1 wherein the sampling aperture is positioned at a physical extremity of the beam sampler, thereby to allow movement of the sampler close to the emitting or transmitting surface.

3. A wavefront measurement system as claimed in claim 1 wherein the beam sampler includes an optical system for relaying an image of the sampled area on to the sampling aperture.

4. A wavefront measurement system as claimed in claim 3 wherein the optical system is telecentric.

5. A wavefront measurement system as claimed in claim 3 wherein the optical system comprises one or more lenses.

6. A wavefront measurement system as claimed in claim 1 wherein the sampling aperture has one or more dimensions in the range of 20-50 microns.

7. A wavefront measurement system as claimed in claim 1 wherein the reflector has one of a conical, a pyramidal and an external roof reflecting surface, and the sampling aperture is positioned at an apex thereof.

8. A wavefront measurement system as claimed in claim 1 wherein the reflector has one of a truncated conical and a truncated pyramidal reflecting, and the sampling aperture is positioned at an apex thereof.

9. A wavefront measurement system as claimed in claim 1 wherein the absorber extends wholly round the reflector.

10. A wavefront measurement system as claimed in claim 1 wherein the beam sampler and the absorber are connected.

11. A wavefront measurement system as claimed in claim 1 wherein the beam sampler and the absorber are not connected.

12. A wavefront measurement system as claimed in claim 1, wherein the absorber comprises one or more absorber elements or parts.

13. A wavefront measurement system as claimed in claim 12 wherein the absorber includes multiple parts positioned at different locations around the reflector.

14. A wavefront measurement system as claimed in claim 1, further comprising:
a scanner configured to cause relative movement between the beam sampler and the laser, thereby to scan the laser wavefront.

15. A wavefront measurement system as claimed in claim 14 wherein the scanner is configured to move the beam sampler.

16. A wavefront measurement system as claimed in claim 14 wherein the scanner is configured to move the laser.

17. A wavefront measurement system as claimed in claim 1 wherein the sensor comprises at least one of a CCD array and a quadrant photodetector.

18. A wavefront measurement system as claimed in claim 1 wherein the sensor comprises a linear array of detectors, the array including two or more detectors.

19. A wavefront measurement system as claimed in claim 1 wherein the sensor is an active element that is laterally un-segmented and configured to sense the centroid of the diffraction pattern.

20. A wavefront measurement system as claimed in claim 1, further comprising:
one or more attenuating filters placed between the sampling aperture and the sensor.

21. A wavefront measurement system as claimed in claim 1 wherein the absorber includes a cooling system.

22. A wavefront measurement system as claimed in claim 21 wherein the cooling system is a liquid-cooled system.

23. A wavefront measurement system as claimed in claim 1 wherein the absorber has a high heat capacity.

24. A wavefront measurement system as claimed in claim 1 wherein the absorber has one or more surfaces that are coated with a material that is highly absorbing at the wavelength of a laser beam generating the laser wavefront.

25. A wavefront measurement system as claimed in claim 1 wherein the absorber is structured to enhance radiation trapping.

26. A wavefront measurement system as claimed in claim 1 wherein any one or more of the following is based on the sampled radiation:
distribution of pointing directions over a laser beam generating the laser wavefront;
mean pointing direction of the laser beam;
divergence properties of the laser beam;
intensity at any point upon the laser beam; and
a spatial beam intensity distribution of the laser beam.

27. A wavefront measurement system as claimed in claim 1 wherein at least one of divergence properties and spatial coherence properties of the laser wavefront is based on comparing one of the diffraction pattern with an expected diffraction pattern for a plane wave and statistics of the diffraction pattern with expected statistics of the expected diffraction pattern for the plane wave.

28. A wavefront measurement system as claimed in claim 27 wherein a plurality of measurements is used to determine the at least one of the divergence properties and the spatial coherence properties.

29. A wavefront measurement system as claimed in claim 1 wherein the sampling aperture is substantially circular or elliptical or square or rectangular.

30. A wavefront measurement system as claimed in claim 1 wherein the sampling aperture is a slit.

31. A wavefront measurement system as claimed in where claim 1, further comprising:
one or more lenses between the sampling aperture and the sensor and configured to reduce or enlarge a size of the diffraction pattern on the sensor.

32. A wavefront measurement system as claimed in claim 31 wherein the one or more lenses comprise at least one of a cylindrical and an anamorphic lens configured to reduce or enlarge the size of the diffraction pattern on the sensor by different amounts in two directions.

33. A wavefront measurement system as claimed in claim 32 wherein the at least one of the cylindrical and the anamorphic lens is positioned so that the sampling aperture and the sensor are at conjugate points of the at least one of the cylindrical and the anamorphic lens.

34. A wavefront measurement system as claimed in wherein claim 1, further comprising:
a converging lens located at its focal distance behind the sampling aperture so that a beam travelling from the converging lens to the sensor is substantially collimated.

35. A wavefront measurement system as claimed in claim 1 wherein a distance between the sampling aperture and the sensor is such that the diffraction pattern is substantially contained within an active area of the sensor.

36. A wavefront measurement system as claimed in claim 1, further comprising:
a screen between the sensor and the sampling aperture.

37. A wavefront measurement system as claimed in claim 36 wherein the screen is close to or is a part of the sensor.

38. A wavefront measurement system as claimed in claim 36, further comprising:
one of a single lens and a system of multiple optical elements configured to relay an image of a beam incident on the screen to an image plane of the sensor.

39. A wavefront measurement system as claimed in claim 36, further comprising:
    one of a single lens and a system of multiple optical elements configured such that an image of the diffraction pattern incident on the sensor is substantially contained within an active area of the sensor.

40. A wavefront measurement system as claimed in claim 36 wherein the screen comprises an optical diffuser.

41. A wavefront measurement system as claimed in claim 40 wherein the optical diffuser is positioned so as to average out effects of laser speckle on a beam incident on the sensor.

42. A wavefront measurement system as claimed in claim 41 wherein the optical diffuser is position by at least one of translating, rotating or vibrating the optical diffuser.

43. A wavefront measurement system as claimed in claim 36, wherein the screen comprises a wavelength-converting material.

44. A wavefront measurement system as claimed in claim 43 wherein the wavelength converting material comprises a phosphorescent screen.

45. A wavefront measurement system as claimed in claim 1 wherein the sensor comprises two or more sensors.

46. A wavefront measurement system as claimed in claim 1, further comprising:
    a beam divider located between the sampling aperture and the sensor and configured to divide a beam into two or more parts.

47. A wavefront measurement system as claimed in claim 46 wherein the two or more parts of the beam are directed onto two or more sensors.

48. A wavefront measurement system as claimed in claim 47 wherein the two or more sensors are of different types.

49. A wavefront measurement system as claimed in claim 1 wherein the reflector is sized and shaped so that substantially all of the unsampled radiation is directed onto the absorber.

50. A wavefront measurement system as claimed in claim 1 wherein the reflector is an integral part of the beam sampler.

* * * * *